US008134587B2

(12) United States Patent
Niu et al.

(10) Patent No.: US 8,134,587 B2
(45) Date of Patent: Mar. 13, 2012

(54) AGGREGATION OF VIDEO RECEIVING CAPABILITIES

(75) Inventors: Ling Niu, Redmond, WA (US); Timothy M. Moore, Bellevue, WA (US); Shiwei Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 12/034,743

(22) Filed: Feb. 21, 2008

(65) Prior Publication Data

US 2009/0213206 A1    Aug. 27, 2009

(51) Int. Cl.
    *H04N 7/14*    (2006.01)
(52) U.S. Cl. .................. 348/14.12; 348/14.09
(58) Field of Classification Search ............... 348/14.01, 348/14.07, 14.08, 14.09, 14.12; 709/204; 370/260, 261; 379/202.01
    See application file for complete search history.

(56) References Cited

U.S. PATENT DOCUMENTS

| 6,211,902 | B1 | 4/2001 | Tanoi | 348/14.09 |
|---|---|---|---|---|
| 6,421,706 | B1 | 7/2002 | McNeill | 709/204 |
| 6,909,708 | B1 | 6/2005 | Krishnaswamy | 370/352 |
| 6,922,718 | B2 | 7/2005 | Chang | 709/204 |
| 7,085,243 | B2 | 8/2006 | Decker | 370/261 |
| 7,089,285 | B1 | 8/2006 | Drell | 709/204 |
| 7,133,512 | B2 | 11/2006 | Creamer | 379/202.01 |
| 7,627,629 | B1 * | 12/2009 | Wu et al. | 709/204 |
| 2005/0248652 | A1 | 11/2005 | Firestone | 348/14.09 |
| 2006/0168637 | A1 | 7/2006 | Vysotsky | 725/116 |
| 2007/0116113 | A1 | 5/2007 | Gu | 375/240.1 |
| 2007/0285500 | A1 * | 12/2007 | Ma et al. | 348/14.07 |
| 2008/0055399 | A1 * | 3/2008 | Woodworth et al. | 348/14.12 |

OTHER PUBLICATIONS

Local Coordination for Interpersonal Communication Systems, von Dirk Kutscher, http://elib.suub.uni-breinen.de/publications/dissertations/E-Diss720_phd-thesis-kutscher.pdf, Aug. 2003, pp. i-xiv and 1-304.
Cisco AVVID IP Videoconferencing Solution Overview, http://www.cisco.com/en/US/netsol/ns340/ns394/ns158/ns280/networking_solutions_design_guidance09186a00800c46a6.html, pp. 1-4.
An Introduction to Videoconferencing and Distance Learning, Chris McCuller (Valdosta State University), http://pride.valdosta.edu/Whitepaper_Distance_Learning.pdf.
Videoconferencing, Multipoint Control Units (MCU) and Gateways (DfES Network Services Project), www.ja.net/community/schools/techinfo/documents/Videoconferencingv3.1.doc, copyright 2004 The JNT Association, pp. 1-66.

* cited by examiner

*Primary Examiner* — Tuan Nguyen
(74) *Attorney, Agent, or Firm* — Merchant & Gould

(57) ABSTRACT

Video receiving capabilities of participants and source capabilities are compared and conference capabilities for providing different resolutions, frame rates, bit rate, and number of streams are determined by maintaining a conference receiving capability list updated as number and capability of participants' changes. Preferred receiving capabilities of participants are also taken into account in determining conference characteristics based on comparison with allowed capabilities.

20 Claims, 8 Drawing Sheets

AGGREGATION OF VIDEO RECEIVING CAPABILITIES

BACKGROUND

Videoconferencing uses telecommunications of audio and video to bring people at different sites together for a meeting. This can be as simple as a conversation between two people in private offices (point-to-point) or involve several sites (multipoint) with more than one person in a number of rooms at different sites. Besides the audio and visual transmission of people, videoconferencing can be used to share documents, computer-displayed information, and whiteboards.

Videoconferencing among multiple remote points is sometimes facilitated employing Multipoint Control Unit (MCU). An MCU is a bridge that interconnects calls from several sources. All parties call the MCU, or the MCU may call the parties which are going to participate, for initiating the conference. MCUs may use various protocols such as Internet Protocol (IP), and be structured as software program(s), hardware, or combination of the two. One of the main tasks for an MCU is to organize the conference based on capabilities of the participating parties (e.g. receiving parties and source in a single source directed conference).

MCU controlled video conferences may be facilitated supporting a fixed resolution video stream or accommodating multiple video streams with different resolutions. The conference may be initiated directly by the MCU or escalate from a peer-to-peer chat, where each participant may be provided the ability to request and deliver multiple video sources. When multiple participants with different capabilities request varying resolutions, it is a challenge for the MCU to coordinate those and accommodate the video conference in an optimized fashion, especially if the number of participants is large.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to accommodating a video conference for participants with varying capabilities with flexibility to meet different aggregation criteria, speed to handle large number of requests without degrading user experience, and ability to provide participants with multiple view sources.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, participants with varying resolution capabilities may be accommodated in a video conference with flexibility to meet different aggregation criteria, speed to handle large number of requests without degrading user experience, and ability to provide participants with multiple view sources. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While embodiments are described for video conference systems, they are not limited to strictly video conferencing. Network-based conferences combining various forms of communication such as audio, video, instant messaging, application sharing, and data sharing may be facilitated using the principles described herein.

Figure 1:
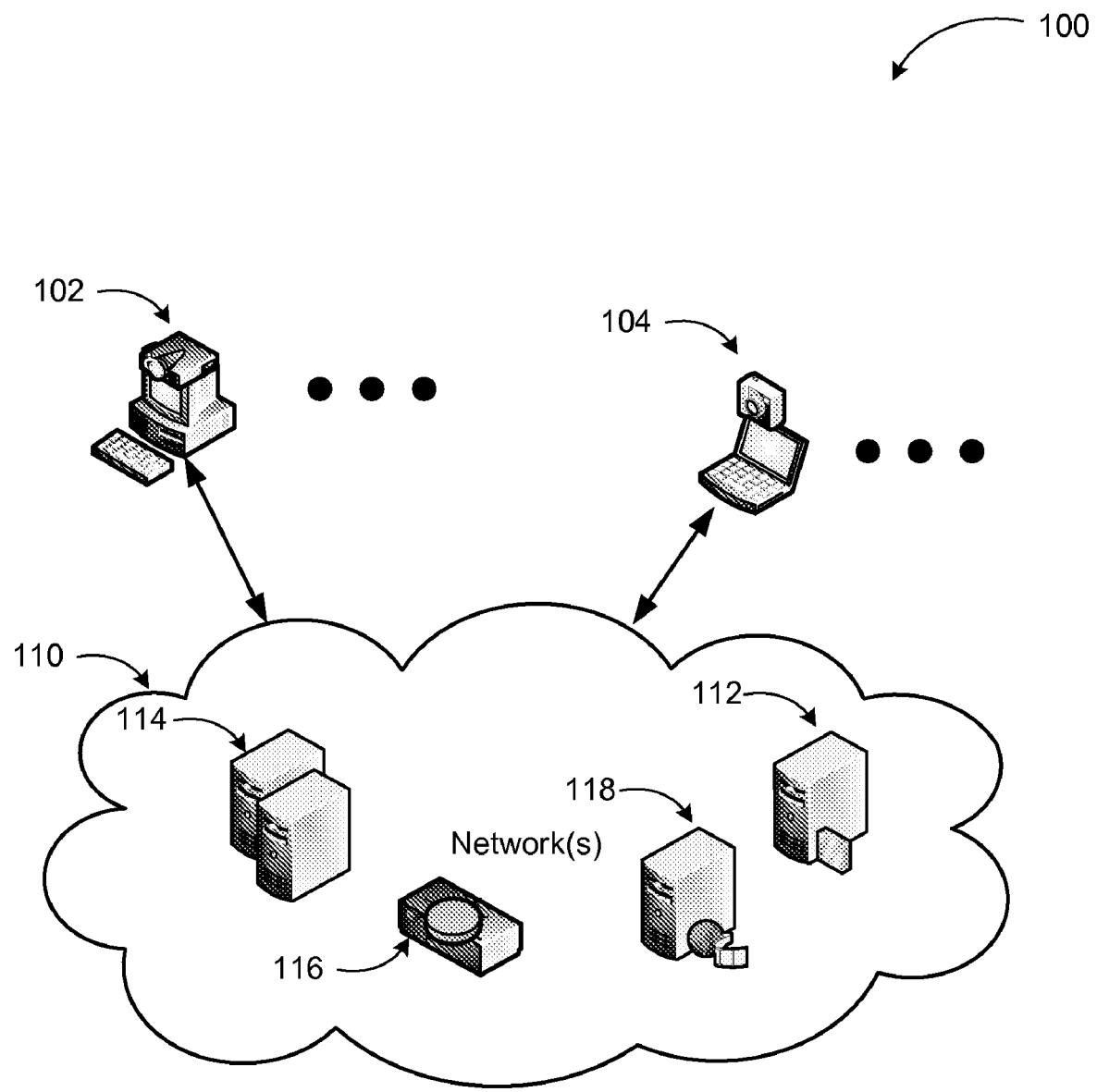
FIG. 1 is a diagram illustrating an example video conferencing system.

Referring to FIG. 1, diagram 100 of an example video conferencing system is illustrated. At the core of a video conferencing system is a network (e.g. network 110) enabling a number of participants (102, 104) with audio/video transmission and reception capability to communicate with each other as a group. Participant machines 102, 104 may be any computing device with audio/video capability such as desktop or laptop computers with a camera and microphone (as well as a speaker), specialized video conferencing equipment, or even mobile devices with audio/video capabilities.

Network 110, as discussed in more detail below, may be any communication network or combination of networks. The video conference may be facilitated by a single device/program or by a combination of devices and programs. For example, audio/video server 118, firewall server 112, or mediation servers 114 may be involved with different aspects of the conference such as storage and processing of audio/video files, security, or interconnection of various networks for seamless communication. Any of these example tasks and others may be performed by software programs, hardware devices, and/or combination of the two.

According to one embodiment, MCU 116 may be the main facilitator of the video conference in coordination with one or more of the other devices and/or programs mentioned. MCU 116 may use various protocols such as Internet Protocol (IP), and be structured as software program(s), hardware, or combination of the two. MCU 116 may be a stand-alone hardware device, or it may be embedded into dedicated conferencing devices (e.g. audio/video server 118 or mediation servers 114). Furthermore, MCU 116 may be structured as a "decentralized multipoint", where each station in a multipoint call exchanges video and audio directly with the other stations with no central manager or other bottleneck.

As mentioned previously, an MCU controlled video conference may support receiving one video stream with fix resolution or receiving multiple video streams with different resolutions. MCU 116 may support, in addition to regular video conferences, multi-party conferences that escalate from a peer-to-peer chat through a mesh network.

To provide each participant with the ability to request multiple video sources and deliver the right streams, MCU 116 has to consider various factors including: receiver's capabilities (e.g. PC or mobile device's processing power, downlink bandwidth to the client during the meeting), sender's capabilities (e.g. PC or mobile device's processing power, uplink bandwidth from the client during the meeting), viewer's preferences (e.g. number of sources to view, display size of each source), and infrastructure administration (e.g. the need to limit the bandwidth consumed by video conferences).

Video capabilities may be defined as resolution, frame rate, bit rate, number of streams, and the like. One example scenario is when multiple people request the same source to send different video resolutions. This becomes challenging especially when the number of requesters is large (e.g. in hundreds), since the requests have to be aggregated into a single request to the sender.

An MCU according to one embodiment may execute an algorithm flexible to meet different aggregation criteria such as guaranteeing high resolution vs. guaranteeing as many sources as possible. In order to handle a high number of potential requests, the algorithm may be a fast algorithm and allow one participant to request multiple view sources in addition to allowing receiving capabilities to change anytime during the course of a meeting.

Figure 2:
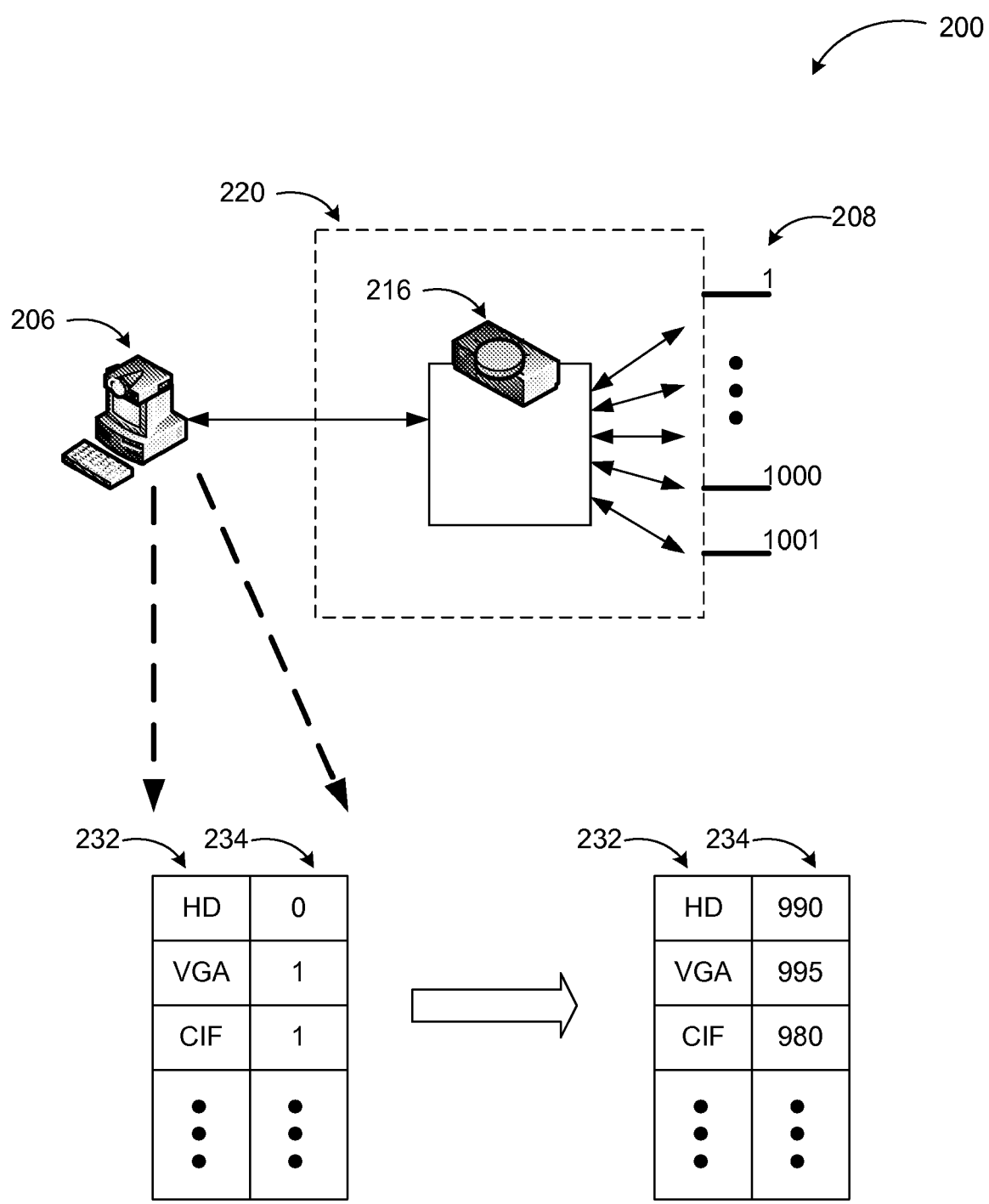
FIG. 2 is a conceptual diagram illustrating an MCU coordinating video conference with a source and multiple receiving participants accommodating various resolutions.

FIG. 2 is a conceptual diagram illustrating an MCU coordinating video conference with a source and multiple receiving participants accommodating various resolutions.

In a single stream conference, at any given time one participant acts as sender (e.g. participant 206) transmitting a single stream of video, which is distributed to a plurality of receivers (208) through MCU 216 in the video conference 220. If the sender (e.g. participant 206) can only send one video stream, the aggregated receiving capability does not need to have a capability group with more than one capability (e.g. resolution), but it may have multiple groups. For example, the aggregated capability may not have one group like: 1 VGA+1 CIF+1 QCIF, but it may have three groups: 1 VGA or 1 CIF or 1 QCIF. Since sender can only send one video stream, the number of streams for each group needs to be "1".

According to one embodiment, the aggregation happens every time a new client (participant) joins or leaves the conference. To control aggregation complexity, MCU 216 compares the new client's capability or leaving client's capability with current MCU aggregated capability without having to browse through all the existing clients' capabilities.

The capabilities may be maintained in a table illustrated by reference numerals 232 and 234, where column 232 lists the available capabilities, and column 234 lists the number of those based on the currently connected participants. For example, in the first instance of the table column 234 show that only one VGA capability and one CIF capability are listed for the first participant in the conference. After 1000 participants have joined, the table is updated to the second instance, where column 234 lists 990 HD capabilities, 995 VGA capabilities, and 980 CIF capabilities.

Figure 3:
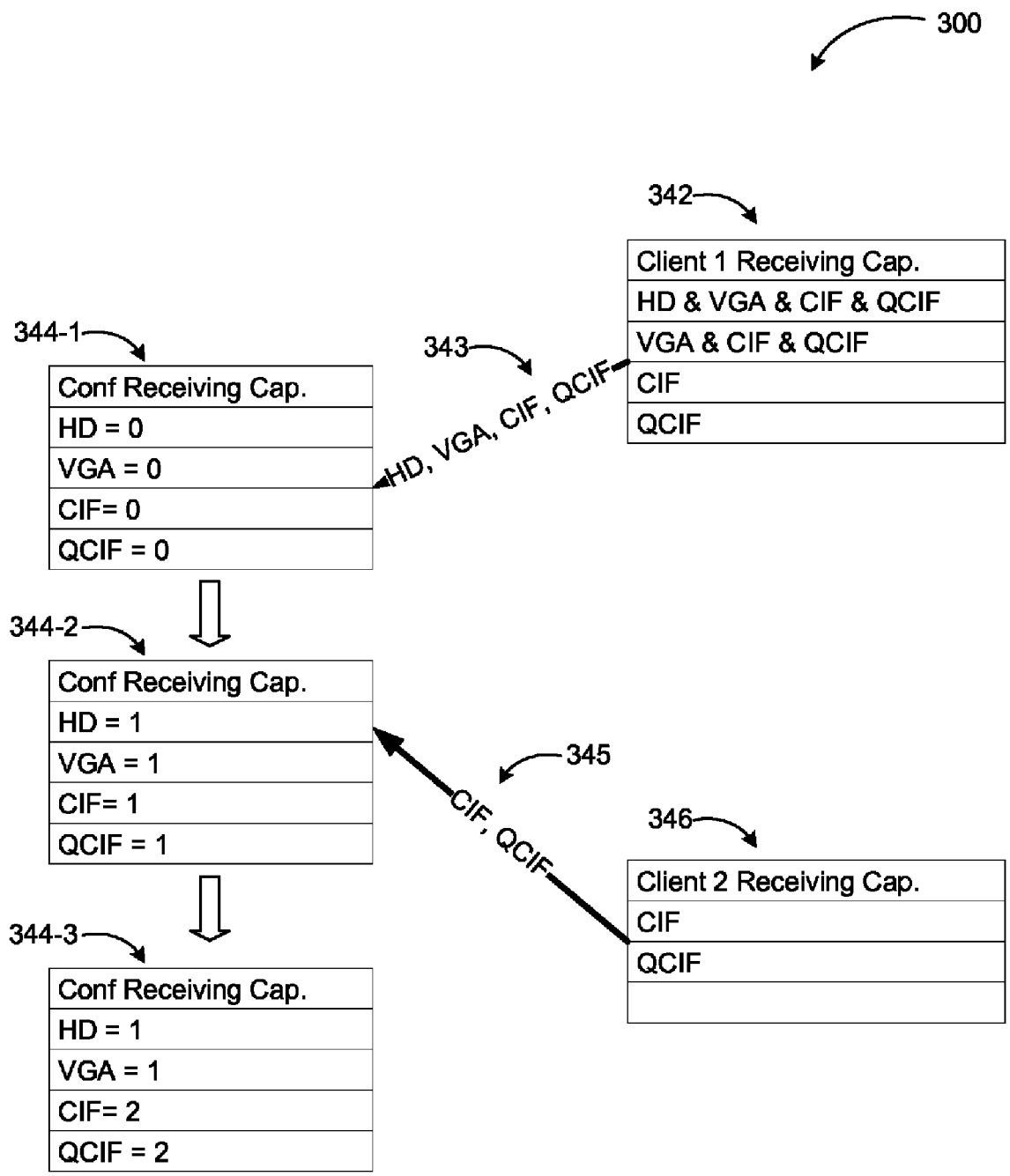
FIG. 3 illustrates an example scenario of exchanging various resolution capabilities between video conference participants.

FIG. 3 illustrates an example scenario of exchanging various resolution capabilities between video conference participants. An MCU according to an example embodiment may start with an empty conference receiving capability table 344-1: HD=VGA=CIF=QCIF=0. When client 1 joins with HD and VGA and CIF and QCIF capability, as illustrated by table 342, the capability information is transmitted to the MCU (343). Even though client 1 is capable of supporting multiple combinations of resolutions (such as one of each resolution, VGA+CIF+QCIF, CIF only, or QCIF only), the MCU is concerned about which capabilities are represented for the currently joined client only. Upon receiving the client information, the MCU updates its capability table 344-2: HD=1, VGA=1, CIF=1, QCIF=1. The MCU also compares each resolution with number of clients. If equal, that means all the clients can support this resolution and it should be in the conference capabilities (in this case, one client).

When client 2 joins with CIF only and QCIF only capability as illustrated in table 346, those capabilities are also transmitted to the MCU (345). The MCU may then update it conference receiving capability table 344-3 as HD=1, VGA=1, CIF2, QCIF=2. Even though client 2 does not support HD and VGA, the table maintains the actual number of clients that support available resolutions. When the MCU sends out aggregated conference receiving capability, HD and VGA do not appear, because client 2 does not support those resolutions. Thus, the aggregated result sent to the clients is different from table 344-3 maintained for tracking conference receiving capabilities of the clients.

For each additional client joining the conference, the same iterative update—comparison—update process may be performed enabling the MCU to maintain an up-to-date list of capabilities common to all participants and their number. The same process is repeated when a client leaves the conference.

It should be noted, that even if same resolution appears more than once in receiving capability, it is counted once.

An MCU according to embodiments may execute two algorithms: the first one for aggregation of the receiving capability and the second for preferred receiving capability of each stream that a client requests. The receiving capability defines the overall receiving capability of a client. Both capabilities need to be aggregated. Of course, both tasks may also be performed by a single algorithm.

Figure 4:
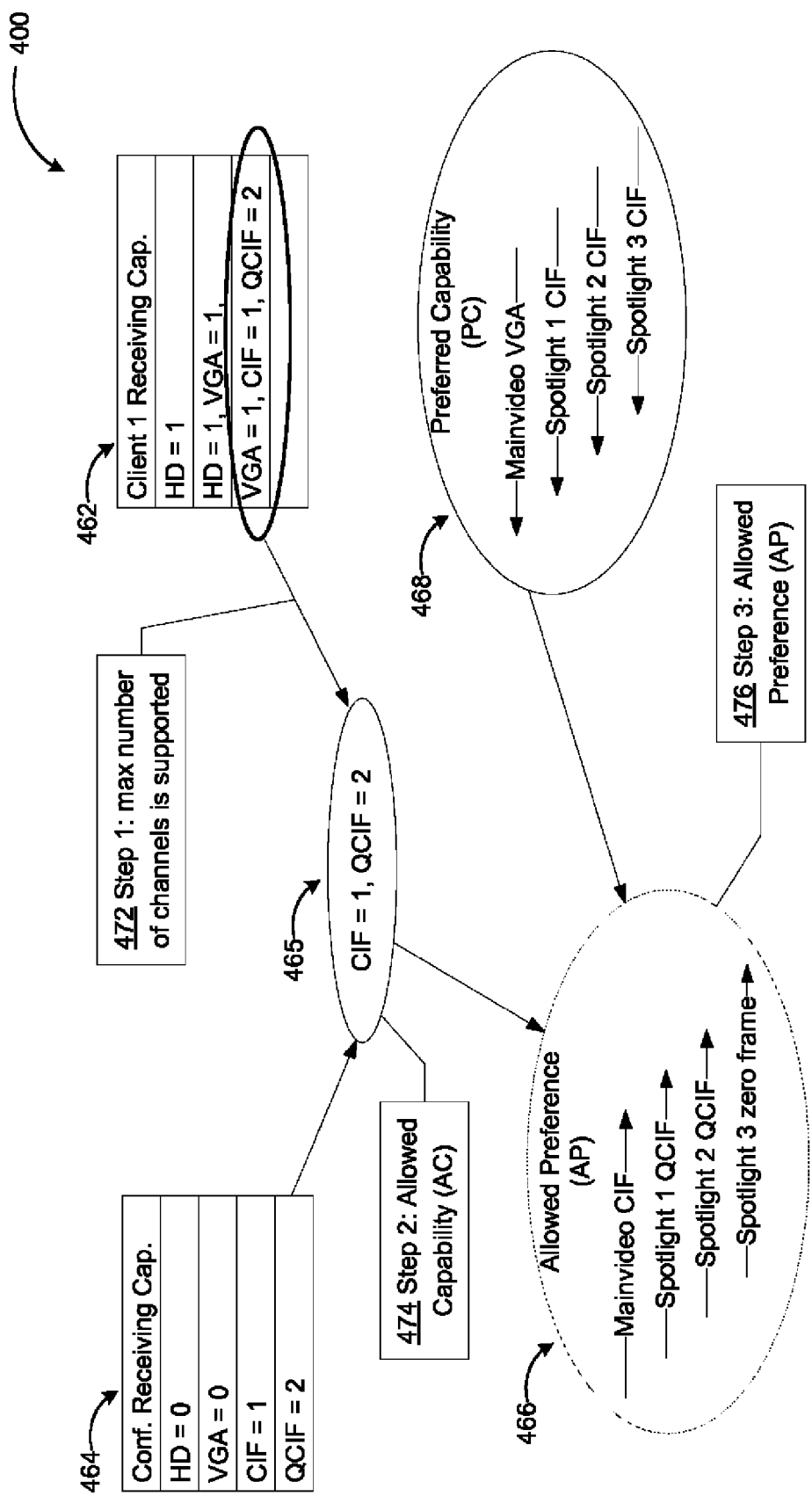
FIG. 4 illustrates determination of allowed capabilities based on preferences in an example system according to embodiments.

FIG. 4 illustrates determination of allowed capabilities based on preferences in an example system according to embodiments. In a system according to some embodiments, each client may specify a preferred capability (PC) on each stream it subscribes to. Before processing the preferred capability, the MCU may first decide which receiving capability group from the same client should be used to work with. For example, a participant may have group 1: 1 HD+1 VGA+1 CIF and group 2: 1 CIF+3 QCIF. If the desire is to provide highest resolution, then group 1 may be selected. If the desire is to provide as many channels as possible, then group 2 may be selected.

Once the group is chosen, MCU may compare the selected group with conference receiving capability (as discussed above in FIG. 3) and generate an allowed capability (AC), which contains the lower resolution of the two sets. For example, the selected group may be 1 CIF+3 QCIF, and conference capability may be VGA or CIF or QCIF. Then, the allowed capability is 1 CIF+3 QCIF. This is to guarantee that no capability exceeds the conference receiving capability of the system. The MCU may then decide an allowed preference (AP) of each stream based on the lower resolution between the AC and the PC. As available streams are used up, no availability may be assigned to some of the requested streams.

Diagram 400 illustrates an example determination scenario for a video conference with four possible source streams (main video, spotlight 1, spotlight 2, and spotlight 3). Client 1 is capable of receiving 1 HD or 1 HD+1 VGA, or 1 VGA+1 CIF+2 QCIF as illustrated in client 1 receiving capability table 462. The MCU has conference receiving capability as 1 CIF+1 QCIF as indicated in table 464. Thus, the client's maximum number of supported channels is 1 VGA+1 CIF+2 QCIF (472). Comparing this with the conference receiving capability, the MCU decides in step two (474), the allowed capability is 1 CIF+2 QCIF.

Client 1 may also indicate that its preferred capability 468 is VGA main video, CIF spotlight 1, CIF spotlight 2, and CIF spotlight 3 (1 VGA+3 CIF). Comparing that to the allowed capability (AC), the MCU decides in step 3 (476) the allowed preference (AP) 466, which is CIF main video, QCIF spotlight 1, QCIF spotlight 2, and zero frame spotlight 3 (1 CIF+1 QCIF).

As the MCU determines the allowed preference, it does so by selecting for each stream the lower of the allowed capability and the preferred capability and then subtracting that allowed preference from the total allowed capabilities. Once all the allowed capabilities are exhausted, the rest of the allowed preferences (for remaining streams) are set to zero frame without specifying resolution. The reason for setting to zero frame is to allow the MCU to drop all the frames on the remaining stream(s).

In a multi-source conference, the MCU aggregates the allowed preference (AP) for each source whenever there is a change in preferred capability to avoid browsing through all the clients. The MCU starts with a conference allowed preference table assumed for main video stream. Before the meeting presenter starts to select other sources (spotlights), the clients (participants) do not know what to subscribe to, so the MCU assumes only the main video stream.

If a first client joins and sends VGA as preferred capability for main video, the MCU set main video to VGA. If another client joins with CIF as preferred capability, the MCU switches main video to CIF. At this point, the MCU chooses the lowest resolution to request to main video source.

Once the meeting presenter chooses the spotlight sources (e.g. through a conference document), each client is able to associate a spotlight source with a preferred capability. For example, when a client subscribes to stream spotlight source 1 with a preferred capability CIF, the MCU performs the above discussed analysis and determines allowed preference for this stream (e.g. QCIF). Then, the MCU creates a global conference allowed preference table for spotlight source 1, containing HD=0, VGA=0, CIF=0, QCIF=1.

An example conference allowed preference table constructed by the MCU for each source may look like this:

| Source Resolution | Spotlight source 1 | Spotlight source 2 | Spotlight source 3 | Spotlight source 4 | Primary DS |
|---|---|---|---|---|---|
| HD | 0 | 0 | 0 | 0 | 1 |
| VGA | 0 | 0 | 0 | 0 | 8 |
| CIF | 10 | 5 | 8 | 9 | 2 |
| QCIF | 1 | 6 | 3 | 0 | 0 |

The MCU selects the lowest resolution of each column. When a participant leaves the meeting, or un-subscribes from a particular video stream, its local preferred capability (PC) is subtracted from conference allowed preference table.

One special receiver to be considered is the Primary Dominant Speaker (also referred to as Primary Video Source "PVS"), who may request to Secondary (previous) Dominant Speaker (also referred to as Secondary Video Source "SVS") as its main video source. Therefore, this one does not need to be aggregated with others. The MCU may just send the Primary Dominant Speaker's local main video preferred capability (PC) to the Secondary Dominant Speaker. The Primary Dominant Speaker's local main video preferred capability (PC) may be subtracted from main video conference allowed preference table, since that participant does not need to receive its own video.

The above described algorithms, capabilities, and parameters are for example purposes and do not constitute a limitation on embodiments. Aggregation of video receiving capabilities in a conference system may be performed and capabilities computed through additional or fewer steps, capabilities, and components using the principles described herein.

Figure 5:
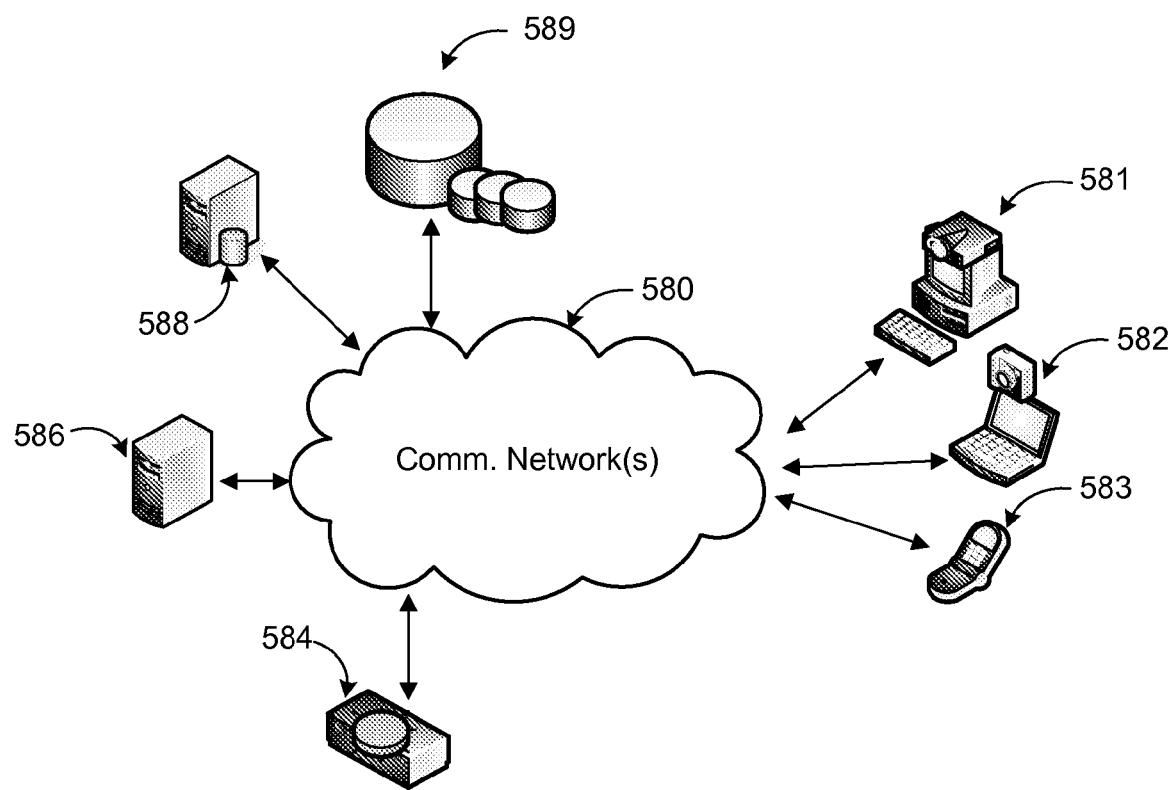
FIG. 5 illustrates a networked environment where embodiments may be implemented.

FIG. 5 is an example networked environment, where embodiments may be implemented. Aggregating video receiving capabilities as described previously may be implemented locally or in a distributed manner over a number of physical and virtual clients and servers. Such a system may typically involve one or more networks such as communication network (s) 580. The conference may also be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device associated with a participant of the video conference. A system according to embodiments may involve many more components, typical and relevant ones are discussed in conjunction with this figure.

Video conference with aggregated receiving capabilities may be facilitated by MCU 584 alone or in conjunction with server 586. Server 586 may provide complementary services such as storing and processing audio/video data. Data associated with the video conference (e.g. displayed documents, participant addresses, etc.) may be stored in one or more data stores such as data stores 589, which may be directly accessed by the servers and/or clients of the system or managed through a database server 588. Communication network(s) 580 provides the backbone of the video conference system and may employ a number of protocols such as SIP, RTP, and the like. Client devices (e.g 581-583) provide platforms for participants to transmit and receive audio/video and other signals. Users may access the conference system using a client device or one or more client applications running on a client device.

Communication network(s) 580 provides communication between the nodes described herein. By way of example, and not limitation, communication network(s) 580 may include wired media such as a wired network or direct-wired connection, and wireless media such as acoustic, RF, infrared and other wireless media.

Many other configurations of computing devices, applications, data sources, data distribution systems may be employed to implement aggregation of video receiving capabilities. Furthermore, the networked environments discussed in FIG. 5 are for illustration purposes only. Embodiments are not limited to the example applications, modules, or processes.

Figure 6:
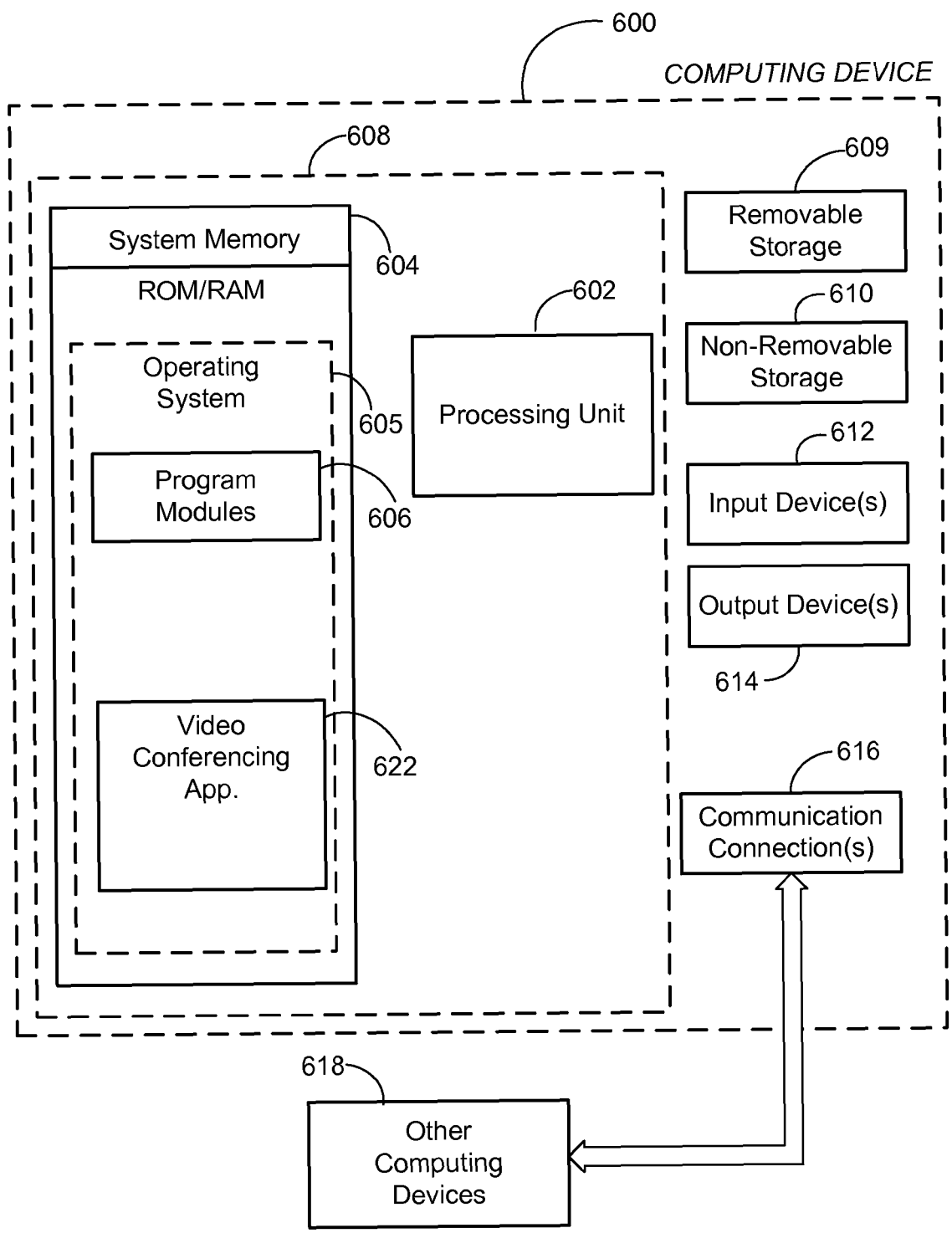
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a server executing a programs associated with the functionality of an MCU for facilitating a video conference. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the computing device, such as the WINDOWS® operating systems from MICROSOFT CORPORATION of Redmond, Wash. The system memory 604 may also include one or more software applications such as program modules 606 and video conferencing application 622.

Video conferencing application 622 may be a separate application or an integral module of a hosted service application that provides advanced communication services through computing device 600, as described previously. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include client devices and servers of the communications network defined above. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
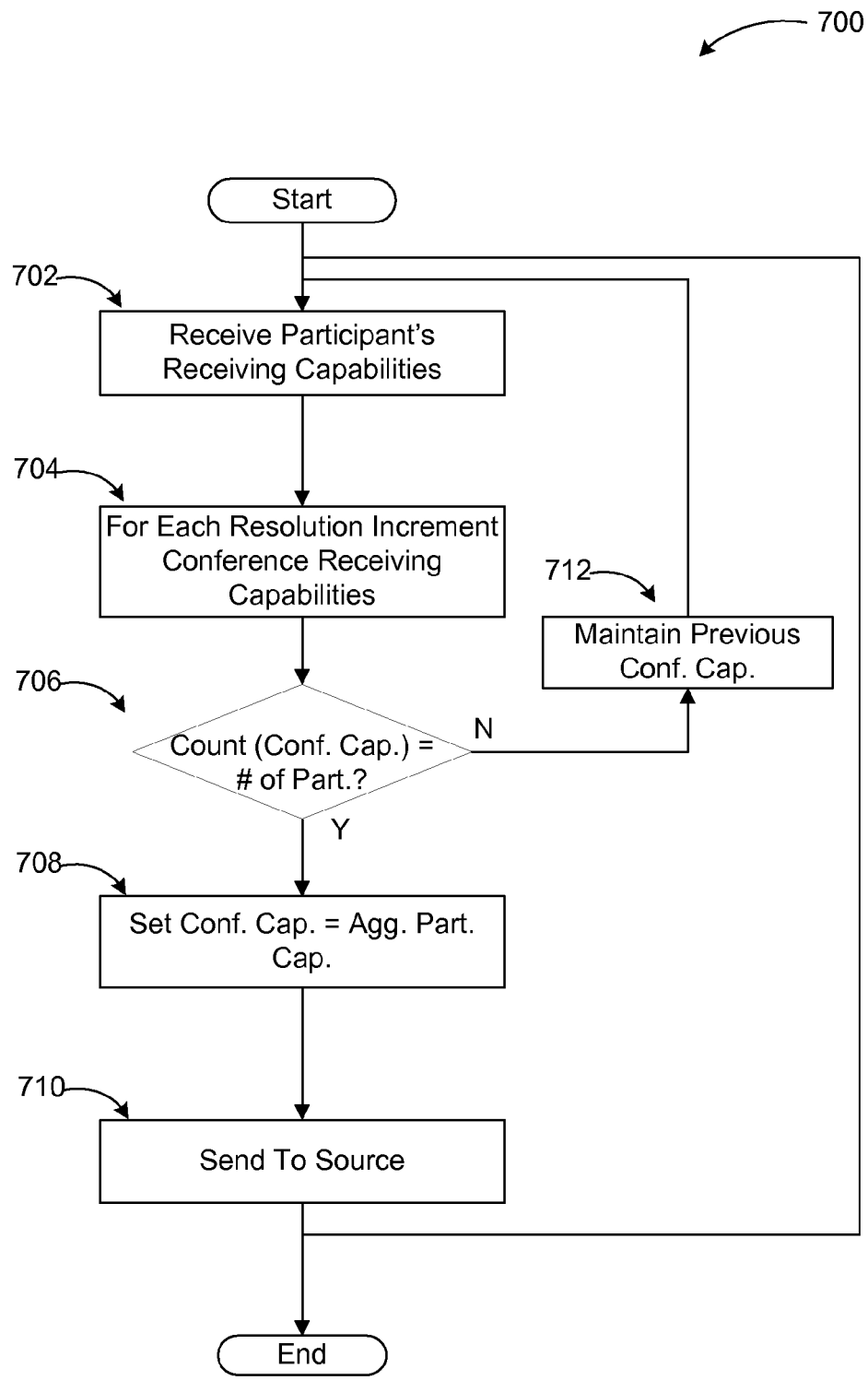
FIG. 7 illustrates a logic flow diagram for a process of accommodating a multi-stream video conference with participants having different resolution capabilities according to embodiments.

FIG. 7 illustrates a logic flow diagram for process 700 of aggregating video receiving capabilities according to embodiments. Process 700 may be implemented in an MCU device facilitating video conferencing.

Process 700 begins with operation 702, where a participant's receiving capabilities are received by the MCU. At the beginning of a conference, the MCU may set default capabilities for the conference based on the source's (sender's) capabilities or assumed receiver capabilities. Processing moves from operation 702 to operation 704.

At operation 704, the conference receiving capabilities are incremented for each resolution as illustrated in the example of FIG. 3. Processing advances from operation 704 to decision operation 706, where a determination is made whether a count of conference receiving capabilities is equal to a number of participants. If the numbers are not the same, previous conference receiving capabilities are maintained at subsequent operation 712 and processing returns to operation 702 for receiving another participant's capabilities.

If the determination at decision operation 706 is affirmative, conference receiving capabilities are set to the aggregated participant receiving capabilities at operation 708 and the new capability information is transmitted to the current source for the conference at the subsequent operation 710. After operation 710, processing may return to operation 702 for receiving another participant's capabilities.

Figure 8:
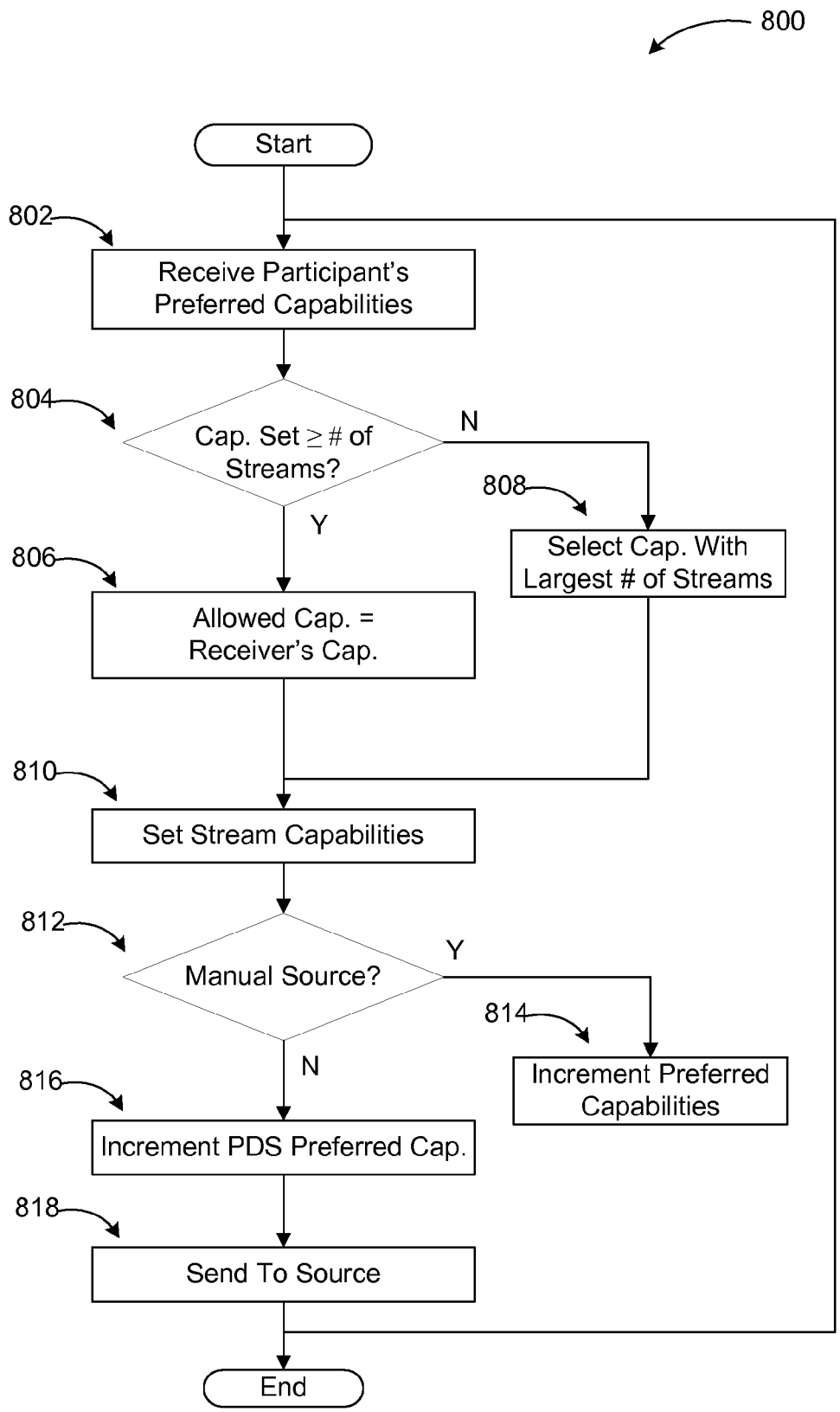
FIG. 8 illustrates a logic flow diagram for a process of aggregating video receiving capabilities for multiple streams according to embodiments.

FIG. 8 illustrates a logic flow diagram for process 800 of aggregating video receiving capabilities for multiple streams according to embodiments. Process 800 may also be implemented in an MCU device facilitating video conferencing.

Process 800 begins with operation 802, where a participant's preferred capabilities are received by the MCU as sets of capabilities for different streams. A goal of the MCU may be to supply as many send streams as possible. Processing moves from operation 802 to decision operation 804, where a determination is made whether a set of conference receiving capabilities larger than a number of available streams exists. If conference receiving capability sets larger than the number of streams exist, the allowed receiving capabilities is set to the receiving participant's capabilities at subsequent operation 806. Otherwise, the set of capabilities with largest number of streams is selected at operation 808.

Following operations 806 and 808, receiving capabilities are set for each stream from highest resolution to lowest preferred resolution on each stream at operation 810. In setting the receiving capabilities, if the allowed receiving capabilities have the participant's preferred capabilities, the capabilities for the particular stream may be decremented by one (indicating one participant is subscribed to the particular stream). If the participant's preferred capabilities are not supported for the particular stream, the capability may be set to next lower capability (e.g. resolution) and the capabilities for the particular stream decremented by one. Finally, if there are no more capabilities available, the particular stream may be marked as zero frame rate and not used for the conference. Processing moves from operation 810 to decision operation 812.

At decision operation 812, a determination is made whether the send stream is sourced by a manual stream (e.g. main video or spotlight). If the send stream is manually sourced, the preferred capabilities are incremented for the manual source at the subsequent operation 814. If the send stream is sourced by a dominant speaker selection, dominant speaker's preferred capabilities are increments at operation 816.

According to some embodiments, each send stream may have a preferred capability to request from the sender. If the stream is manually sourced, the preferred capability may be set to lowest resolution as discussed above for manual stream. If the stream is a Primary Video Source (PVS) stream, the preferred resolution may be set as discussed above and the preferred capability removed from the main video request. If the stream is a Secondary Video Source (SVS) stream, the preferred capability may be set to the PVS's main video preferred capability.

The allowed preferred capabilities for each stream are then send to the current source for the video conference at operation 818. Processing may return to operation 802 for receiving another participant's capabilities.

The operations included in processes 700 and 800 are for illustration purposes. Aggregation of video receiving capabilities may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for aggregating participant capabilities in a video conference, the method comprising:
   receiving a participant's video receiving capabilities comprising at least one video resolution;
   for each resolution incrementing a list of conference receiving capabilities;
   determining if a count of aggregated conference receiving capabilities is equal to a number of participants;
   if the count of aggregated conference receiving capabilities is equal to the number of participants, maintaining the incremented list of conference receiving capabilities; else
   reverting to the unincremented list of conference receiving capabilities; and
   sending the list of conference receiving capabilities to a current source for the video conference.

2. The method of claim 1, further comprising:
   updating the list of conference receiving capabilities upon one of: joining and departing of a participant in the video conference.

3. The method of claim 1, wherein video resolution includes one of: High Definition (HD), Video Graphics Array (VGA), Common Intermediate Format (CIF), and Quarter Common Intermediate Format (QCIF) resolution.

4. The method of claim 1, wherein receiving the participant's video receiving capabilities includes receiving at least one set of video resolutions for a plurality of video streams.

5. The method of claim 4, further comprising:
   determining an allowed set of capabilities for the participant by:
      if a desired goal is to provide highest resolution, selecting a set of video resolutions with highest video resolution for the participant;
      if the desired goal is to provide highest number of video streams, selecting a set of video resolutions that support the highest number of video streams for the participant;
      comparing the selected set of video resolutions to conference receiving capabilities to determine a lower one of the video resolutions for each video stream; and
      selecting a set of video resolutions based on the comparison.

6. The method of claim 5, further comprising:
   receiving a set of preferred capabilities defining preferred video resolutions for each of the plurality of video streams in the video conference from the participant.

7. The method of claim 6, further comprising:
   determining an allowed set of preferences for the participant by:
      comparing an allowed video resolution assigned to each video stream in the allowed set of capabilities to a preferred video resolution received from the participant for the corresponding video stream;
      selecting a lower one of the compared video resolutions for each video stream; and assigning zero frame rate to any remaining video streams, once all allowed video resolutions are used.

8. The method of claim 7, further comprising:
maintaining a table of conference receiving capabilities comprising allowed preferences for each of the video streams, wherein the allowed preference for a particular stream is decremented for each new participant.

9. The method of claim 7, wherein the allowed preference is incremented for a manual source, if the video stream is manually sourced.

10. The method of claim 7, wherein a primary dominant speaker preference is incremented, if the video stream is selected based on a presence of a dominant speaker.

11. The method of claim 10, further comprising:
if the primary dominant speaker requests a previous dominant speaker as main video source, transmitting the primary dominant speaker's preferred capability to the previous dominant speaker and decrementing the allowed preference for the video conference.

12. The method of claim 11, further comprising:
if the video stream is a Secondary Video Source (SVS) source, setting the allowed preference to the primary dominant speaker's main video resolution.

13. The method of claim 1, further comprising:
setting initial values of the list of conference capabilities based on one of: transmission capabilities of the current source and a set of default conference capabilities.

14. A Multipoint Control Unit (MCU) for aggregating participant capabilities in a video conference employing multiple video streams, the MCU configured to:
maintain a table of aggregated conference video resolutions initially set to default values for each video stream;
receive a set of receiving video resolution capabilities and a set of preferred receiving video resolutions from each participant joining the video conference;
upon receiving the sets of receiving video resolution capabilities and preferred receiving video resolutions from a participant, compare the receiving video resolution capabilities with the conference video resolutions for each video stream to determine a set of allowed video resolutions for each participant;
compare the allowed video resolutions with the preferred receiving video resolutions to determine a set of allowed preferences for each participant;
update the table of aggregated conference video resolutions based on the allowed preferences for each participant; and
send the aggregated conference video resolutions to a current source for the video conference to facilitate the coordination of video streams for the video conference.

15. The MCU of claim 14, wherein the MCU is further configured to:
determine the set of allowed video resolutions and the set of allowed preferences by selecting a next lower resolution, if the receiving video resolution capability and the preferred receiving video resolution are not supported by the available video streams.

16. The MCU of claim 14, wherein the MCU is further configured to:
determine a number of available video streams based on the allowed receiving video resolutions; and
set any remaining video streams to zero frame rate.

17. The MCU of claim 14, wherein the list of conference receiving video resolutions includes a count of receiving resolutions for each participant plus one for a dominant speaker determining a source for video transmission.

18. The MCU of claim 14, wherein the MCU is one of: a standalone hardware device, a software program executed by a computing device facilitating the video conference, and a combination of a standalone hardware device and a software program.

19. A computer-readable storage medium with instructions stored thereon for aggregating participant capabilities in a video conference, the instructions comprising:
maintaining a table of aggregated conference video resolutions including at least one from a set of: High Definition (HD), Video Graphics Array (VGA), Common Intermediate Format (CIF), and Quarter Common Intermediate Format (QCIF) resolution, the conference video resolutions initially set to default values for each video stream;
receiving a set of receiving video resolution capabilities and a set of preferred receiving video resolutions from each participant joining the video conference;
comparing the receiving video resolution capabilities with the conference video resolutions for each video stream and determining a set of allowed video resolutions for each participant by selecting a next lower resolution of each compared pair;
comparing the allowed video resolutions with the preferred receiving video resolutions and determining a set of allowed preferences for each participant such that a number of available video streams is maximized;
updating the table of aggregated conference video resolutions based on the allowed preferences for each participant; and
transmitting information associated with the aggregated conference video resolutions to a current source for the video conference to facilitate the coordination of video streams for the video conference.

20. The computer-readable storage medium of claim 19, wherein the instructions further comprise:
if a video stream is manually sourced, incrementing a preferred video resolution for the manual source;
if the video stream is a Primary Video Source (PVS), incrementing a primary dominant speaker preferred resolution and removing the primary dominant speaker preferred resolution from a main video preferred resolution; and
if the video stream is a Secondary Video Source (SVS) stream, setting a preferred resolution for the stream to the main video preferred resolution.

* * * * *